US010255507B2

(12) United States Patent
Taylor

(10) Patent No.: US 10,255,507 B2
(45) Date of Patent: Apr. 9, 2019

(54) DETECTION OF AN OBJECT IN A DISTORTED IMAGE

(71) Applicant: CANON KABUSHIKI KAISHA, Tokyo (JP)

(72) Inventor: Geoffrey Richard Taylor, Carlingford (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 15/384,090

(22) Filed: Dec. 19, 2016

(65) Prior Publication Data

US 2018/0173963 A1 Jun. 21, 2018

(51) Int. Cl.
| | |
|---|---|
| *G06K 9/34* | (2006.01) |
| *G06K 9/00* | (2006.01) |
| *G06T 15/20* | (2011.01) |
| *G06T 3/60* | (2006.01) |
| *G06K 9/36* | (2006.01) |

(52) U.S. Cl.
CPC ............ *G06K 9/00771* (2013.01); *G06T 3/60* (2013.01); *G06T 15/20* (2013.01); *G06K 2009/363* (2013.01)

(58) Field of Classification Search
CPC .................. G06K 9/00771; G06K 9/32; G06T 2207/10016; G06T 7/194; G06T 7/215; G06T 7/251; G06T 7/277
USPC .................................................. 382/170–174
See application file for complete search history.

(56) References Cited

U.S. PATENT DOCUMENTS

| 9,087,384 B2 | 7/2015 | Holeva et al. | |
|---|---|---|---|
| 2008/0095459 A1* | 4/2008 | Vitsnudel | H04N 5/23248 382/260 |
| 2010/0150458 A1* | 6/2010 | Angell | G06F 17/30781 382/224 |
| 2011/0002557 A1* | 1/2011 | Kim | H04N 13/264 382/285 |

(Continued)

OTHER PUBLICATIONS

Slawomir Bak, Sofia Zaidenberg, Bernard Boulay, Francois Bremond, Improving Person Re-Identification by Viewpoint Cues, 2014, Author's Preprint.

(Continued)

*Primary Examiner* — Solomon G Bezuayehu
(74) *Attorney, Agent, or Firm* — Canon U.S.A., Inc. IP Division

(57) ABSTRACT

A system and method for determining an object in a distorted image. The method comprises detecting a location of a first part of the object on the distorted image; determining a corresponding location of the first part of the object on an undistorted image plane corresponding to the distorted image based on a plurality of calibration parameters; predicting a location of a second part of the object on the undistorted image plane based on the determined location of the first part on the undistorted image plane; determining a corresponding location of the second part of the object on the distorted image based on the predicted location of the second part of the object on the undistorted image plane and the calibration parameters; and determining the object based on the detected location of the first part of the object and the determined location of the second part in the distorted image.

19 Claims, 11 Drawing Sheets

(56) References Cited

U.S. PATENT DOCUMENTS

| | | | | |
|---|---|---|---|---|
| 2014/0010449 A1* | 1/2014 | Haaramo | ............... | G06T 19/00 382/173 |
| 2014/0232887 A1* | 8/2014 | Berberian | .......... | H04N 5/23248 348/208.6 |
| 2014/0334668 A1* | 11/2014 | Saund | ...................... | G06T 7/20 382/103 |
| 2015/0339537 A1* | 11/2015 | Ikeda | ..................... | H04N 5/232 382/103 |
| 2015/0363636 A1* | 12/2015 | Tate | ...................... | H04N 5/247 382/103 |
| 2016/0034747 A1* | 2/2016 | Jo | ............................. | G06T 3/40 382/118 |
| 2017/0078575 A1* | 3/2017 | Ryu | ....................... | G06T 7/277 |

OTHER PUBLICATIONS

Ziyan Wu; Yuan Li; Richard J. Radke, Viewpoint Invariant Human Re-Identification in Camera Networks Using Pose Priors and Subject-Discriminative Features, IEEE Transactions on Pattern Analysis and Machine Intelligence, Oct. 2013, pp. 1095-1108, IEEE, Piscataway, NJ, 2013.

Yuan Li, Bo Wu, Ram Nevatia, Human Detection by Searching in 3D Space Using Camera and Scene Knowledge, 2008 19th International Conference on Pattern Recognition, ICPR 2008, Dec. 2008, pp. 1-5, IEEE, Piscataway, NJ, 2008.

\* cited by examiner

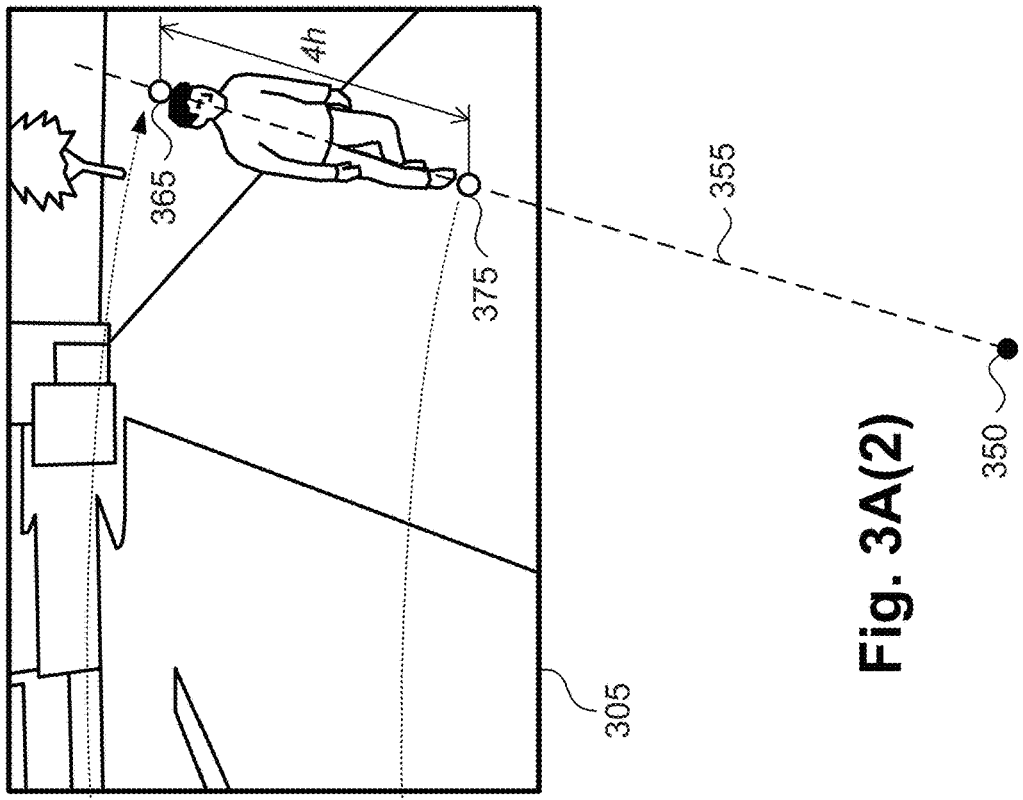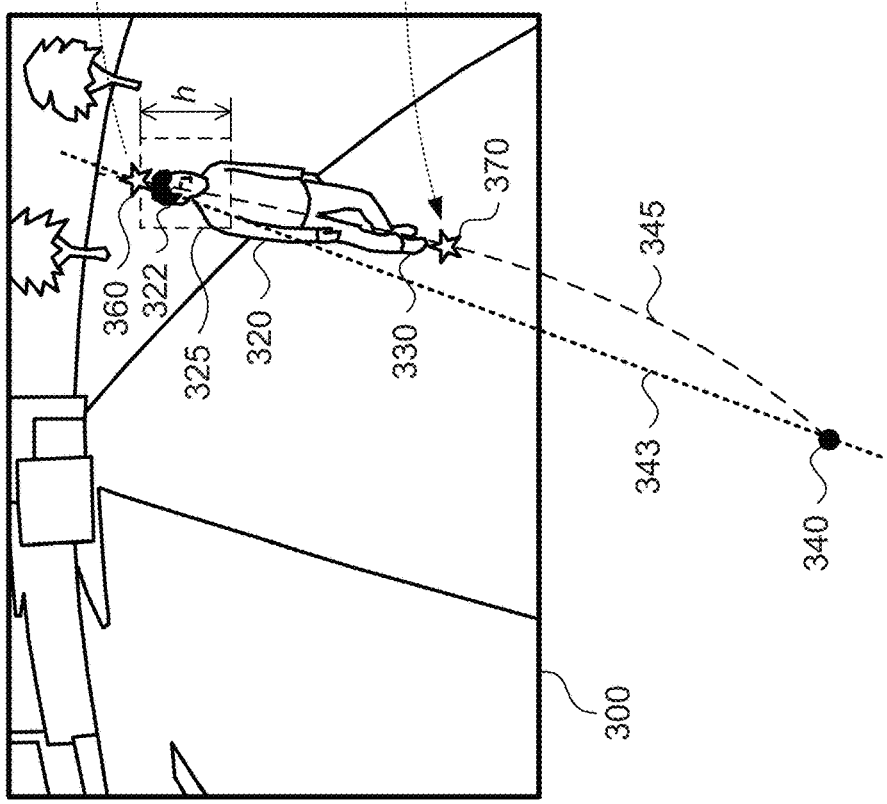

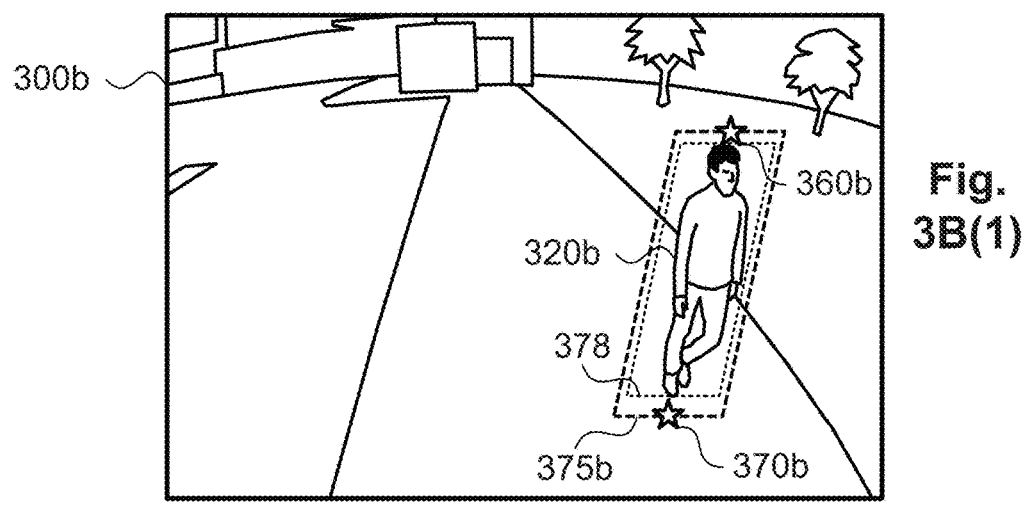
Fig. 3B(1)
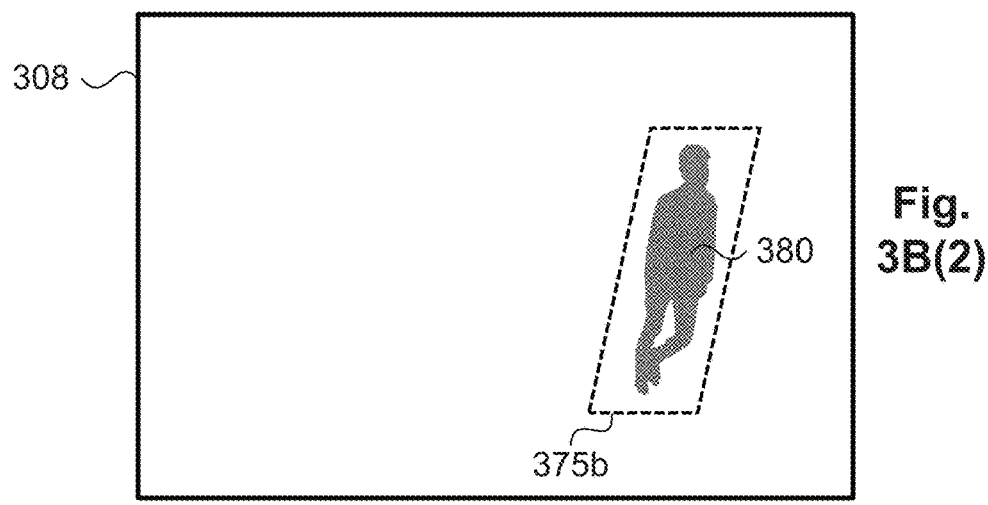
Fig. 3B(2)
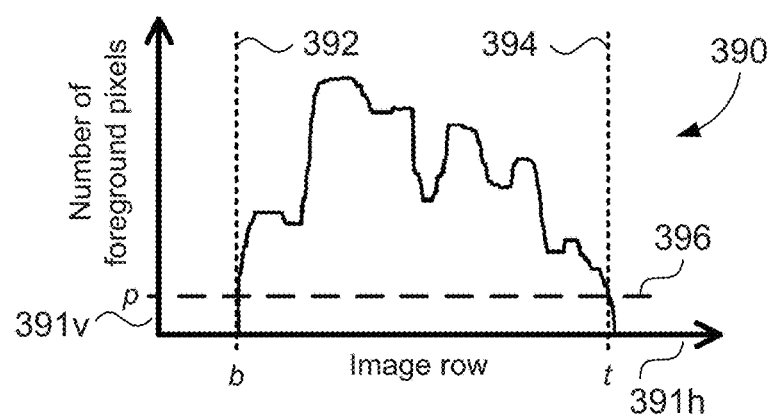
Fig. 3B(3)

DETECTION OF AN OBJECT IN A DISTORTED IMAGE

TECHNICAL FIELD

The present description relates generally to image processing and, in particular, to the problem of detecting an object in an image with radial and projective distortion. The present description also relates to rendering a rectified image of the object. The present description also relates to a computer program product including a computer readable medium having recorded thereon a computer program for detecting an object in an image with radial and projective distortion and rendering a rectified image of the object.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits. In the arrangements described, the terms "person", "target" and "object" relate to an object of interested within at least partial view of a video surveillance camera.

Many surveillance applications require methods, known as "video analytics", to detect, track, match and analyse multiple objects across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

A known method for analysing an object in an image (for example a frame of a video sequence) includes steps of detecting a bounding box containing the object and extracting an appearance descriptor of the object from pixels within the bounding box. In the present disclosure, the term "bounding box" refers to a rectilinear region of an image containing an object, and an "appearance descriptor" refers to a set of values derived from pixels in the bounding box. One example of an appearance descriptor is a histogram of pixel colours within a bounding box. Another example of an appearance descriptor is a histogram of image gradients within a bounding box.

Robust video analytics is typically challenging for two reasons. Firstly, cameras across a network may have different viewpoints, leading to projective distortions including stretching, skewing and rotation. For example, objects in images captured by a camera with a large tilt angle, roll angle or wide field of view can appear stretched, skewed and rotated by varying degrees depending on the object's location in the image. Secondly, cameras with a wide field of view often exhibit radial distortion, also known as "pincushion" or "barrel" distortion. Radial distortion causes straight lines, such as the edges of buildings and a vertical axis of a person, to appear curved in an image. Projective and radial distortion causes the appearance of an object to vary between cameras in a network. Variation in the appearance of the object reduces the reliability of object detection and descriptor extraction, and can cause tracking, matching and other video analytics processes to fail. Furthermore, displaying distorted images to an operator through a graphical user interface can cause operator fatigue, since additional effort is required to interpret the images.

In some known methods, the problems described above are addressed using knowledge of camera calibration to render a "rectified" image of the object in which the distortions are removed. In one known method, a rectified image of an object is rendered by first detecting a bounding box of the object in a distorted image, determining an angular orientation of the object and finally rotating the bounding box so that the object is upright. To determine the angular orientation of the object, this method requires the step of locating of the object in 3D space based on a known camera location and height of the object. A drawback of the known method is that rotating a bounding box does not fully correct for radial and projective distortion. Another drawback is that knowledge of the camera location and height of the object are either unknown or known with low accuracy in practical surveillance systems. Yet another drawback is that detecting a bounding box of an object in a distorted image is unreliable using the known method.

In another known method, a rectified image on an object is rendered by first detecting a bounding box of the object in a distorted image, determining the 3D location of the object and rendering an image of the object from a virtual camera with zero roll and tilt. In the method, the 3D location of the object is determined using knowledge of the 3D camera location and orientation and assuming the scene has a planar ground. A limitation is that the method does not correct for radial distortion. Another limitation of the method is the requirement of a planar ground, which is invalid for scenes with stairs, curbs and other changes in elevation. Another drawback of the method, as with the previously described method, is that knowledge of the camera location is either unknown or known with low accuracy in practical surveillance systems.

Yet another known method first renders the entire image corrected for radial distortion and then renders a set of overlapping sub-images corrected for projective distortion based on the first rendered image. The sub-images correspond to a set of virtual cameras with zero tilt and roll observing a grid of 3D locations on the ground plane of the scene. Sub-image corrections are computed based on knowledge of the 3D camera location. Each sub-image is processed independently to detect a bounding box containing an object. A drawback of the method is the high computational cost of rendering multiple overlapping corrected images covering the entire original image. Another drawback of the method, as with the previously described methods, is that knowledge of the camera location is either unknown or known with low accuracy in practical surveillance systems.

SUMMARY

It is an object of the present disclosure to substantially overcome, or at least ameliorate, one or more disadvantages of existing arrangements.

The present disclosure provides arrangements relating to detecting an object in an image with radial and projective distortion and rendering a rectified image of the object.

One aspect of the present disclosure provides a method for determining an object in a distorted image, said method comprising the steps of: detecting a location of a first part of the object on the distorted image; determining a corresponding location of the first part of the object on an undistorted image plane corresponding to the distorted image based on a plurality of calibration parameters; predicting a location of a second part of the object on the undistorted image plane based on the determined location of the first part on the undistorted image plane; determining a corresponding location of the second part of the object on the distorted image based on the predicted location of the second part of the object on the undistorted image plane and the calibration parameters; and determining the object based on the detected location of the first part of the object and the determined location of the second part in the distorted image.

In some aspects, the object is a person, the first part of the object is the head of the person and the second part of the object is a foot of the person.

In some aspects, the object is a vehicle, the first part of the object is a rear wheel of the vehicle and the second part of the object is a front wheel of the vehicle.

In some aspects, the object is determined by determining a bounding box of the object.

In some aspects, the bounding box in the distorted image is determined based on determined locations of the first and second parts and a foreground mask.

In some aspects, the method further comprises: determining an initial bounding box based on the determined locations of the first object part and second object part on the distorted image; counting a number of foreground pixels for each image row in the bounding box; and determining a refined bounding box based on the highest and lowest image rows in the initial bounding box with a number of foreground pixels exceeding a threshold.

In some aspects, the method further comprises: generating a rectified image of the object based on the determined bounding box; determining an appearance descriptor based on the rectified image; and matching the image of an object to at least one other image of an object based on the determined appearance descriptors.

In some aspects, the method further comprises rotating a sub-image in the bounding box to an upright orientation.

In some aspects, the method further comprises applying a projective rotation of a sub-image in the bounding box to align a centroid of the bounding box to the principal point of a virtual camera with zero roll.

In some aspects, the method further comprises generating a rectified image of the object and displaying the rectified image to an operator via a graphical user interface.

In some aspects, the calibration parameters comprise at least one of tilt angle, roll angle and focal length of an image capture device used to capture the distorted image, the calibration parameters used to derive a vanishing point of the object.

In some aspects, the calibration parameters comprise at least a distortion centre and distortion coefficients of the distorted image.

In some aspects, the calibration parameters comprise at least a distortion centre and distortion coefficients of the distorted image, the distortion centre and the distortion coefficients determined from the distorted image.

In some aspects, the location of a second part of the object on the undistorted image plane is predicted using a point on a vertical vanishing line of the undistorted image plane.

Another aspect of the present disclosure provides a non-transitory computer readable medium having a program stored thereon for determining an object in a distorted image, the program comprising: code for detecting a location of a first part of the object on the distorted image; code for determining a corresponding location of the first part of the object on an undistorted image plane corresponding to the distorted image based on a plurality of calibration parameters; code for predicting a location of a second part of the object on the undistorted image plane based on the determined location of the first part on the undistorted image plane; code for determining a corresponding location of the second part of the object on the distorted image based on the predicted location of the second part of the object on the undistorted image plane and the calibration parameters; and code for determining the object based on the detected location of the first part of the object and the determined location of the second part in the distorted image.

Another aspect of the present disclosure provides apparatus for determining an object in a distorted image, the apparatus configured to detect a location of a first part of the object on the distorted image; determine a corresponding location of the first part of the object on an undistorted image plane corresponding to the distorted image based on a plurality of calibration parameters; predict a location of a second part of the object on the undistorted image plane based on the determined location of the first part on the undistorted image plane; determine a corresponding location of the second part of the object on the distorted image based on the predicted location of the second part of the object on the undistorted image plane and the calibration parameters; and determine the object based on the detected location of the first part of the object and the determined location of the second part in the distorted image.

Another aspect of the present disclosure provides a system comprising: an image capture device configured to capture a distorted image; a memory for storing data and a computer readable medium; and a processor coupled to the memory for executing a computer program, the processor in communication with the image capture device via a network, the program having instructions for: detecting a location of a first part of an object on a distorted image received from the image capture device; determine a corresponding location of the first part of the object on an undistorted image plane corresponding to the distorted image based on a plurality of calibration parameters; predict a location of a second part of the object on the undistorted image plane based on the determined location of the first part on the undistorted image plane; determine a corresponding location of the second part of the object on the distorted image based on the predicted location of the second part of the object on the undistorted image plane and the calibration parameters; and determine the object based on the detected location of the first part of the object and the determined location of the second part in the distorted image.

BRIEF DESCRIPTION OF THE DRAWINGS

One or more example embodiments will now be described with reference to the following drawings, in which:

FIGS. 3A(1)-(2) and 3B(1)-(3) collectively illustrate an example of detecting a first part location and second part location of an object on a distorted image and subsequently determining a bounding box of the whole object;

DETAILED DESCRIPTION INCLUDING BEST MODE

Figure 1:
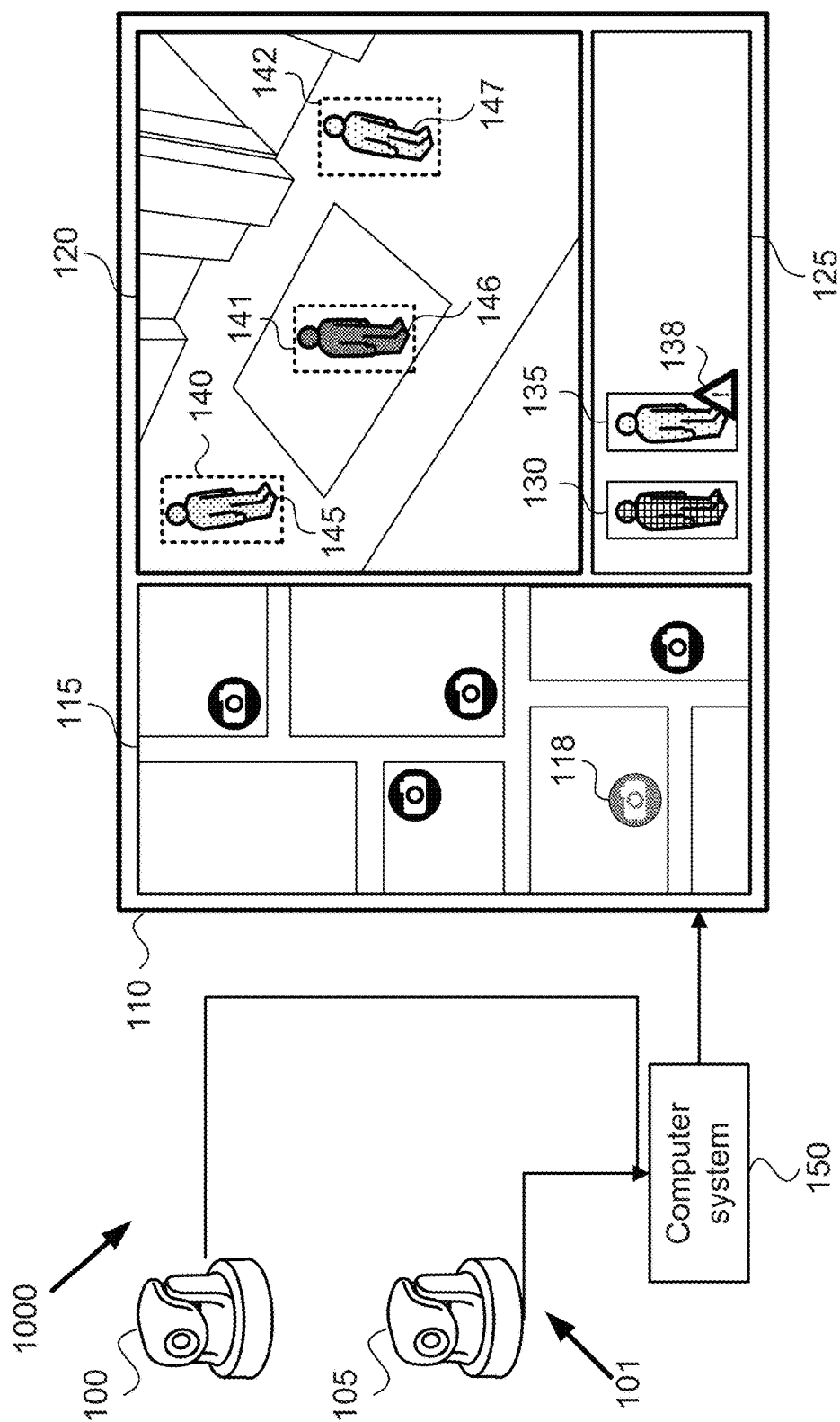
FIG. 1 is a simplified diagram of a surveillance system consisting of a camera network connected to a computer system and a graphical user interface for analysing objects of interest, to which the arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as an image 300 in FIG. 3A(1), is made up of visual elements. The image 300 is captured using an image capture device such as a digital camera or video camera. The term "pixel", also referred to as a "pixel location" or "image location", refers in the present disclosure to one of the visual elements in a captured image. Each pixel of an image is described by one or more values characterising a property of a scene captured in the image. In one example, a single intensity value characterises a brightness of the scene at a pixel location. In another example, a triplet of values characterise a colour of the scene at the pixel location.

A "region", also referred to as an "image region", in an image, such as a region 325 in FIG. 3A(1), refers to a collection of one or more spatially adjacent visual elements. A "feature", also referred to as an "appearance descriptor" or "descriptor", represents a derived value or set of derived values determined from the pixel values in an image region. One example is a histogram of colour values in an image region. Another example is a histogram of quantized image gradient responses in a region.

The phrase "object part", also referred to as a "part", relates to a recognizable and localizable subcomponent of an object in an image. One example of an object part is the head of a person if the person is the object. Another example of an object part is the wheel of a car, the car being the object. A "bounding box" refers to a rectilinear image region enclosing an object or object part in an image, such as the bounding box 325 in FIG. 3A(1) enclosing a head of a person.

The phrase "foreground mask" refers to a binary image with non-zero values at pixel locations corresponding to an object of interest. A non-zero pixel location in a foreground mask is known as a "foreground pixel". In one arrangement, a foreground mask is determined using a statistical background pixel modelling method such as Mixture of Gaussian (MoG), wherein the background model is maintained over multiple frames with a static camera. In another arrangement, foreground detection is performed on Discrete Cosine Transform blocks. In yet another arrangement, a foreground mask is determined using unsupervised segmentation, for example using superpixels. Practitioners skilled in the art will recognize that other methods for determining a foreground mask may equally be practised.

Figure 7C:
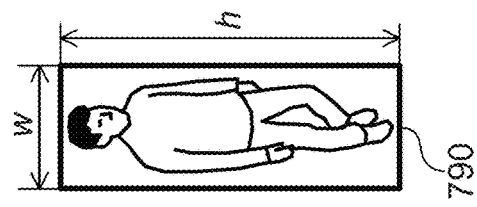
FIGS. 7A, 7B and 7C show an example of rendering a rectified image of an object as used in the method of FIG. 6.
Figure 7B:
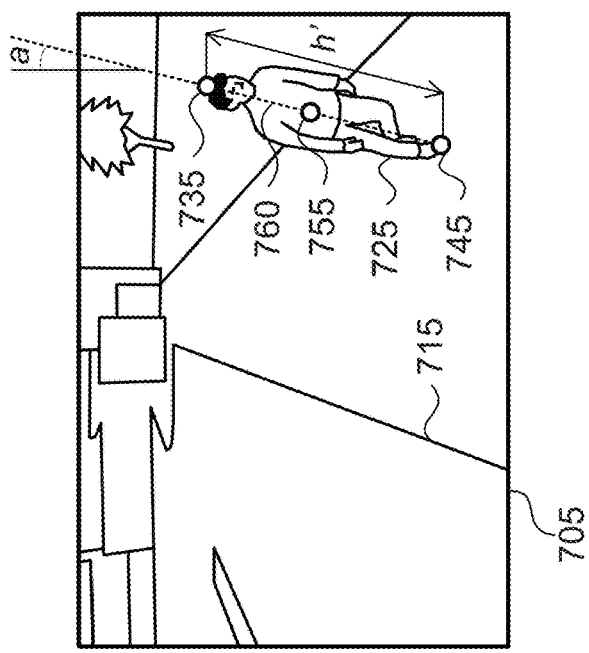
Figure 7A:
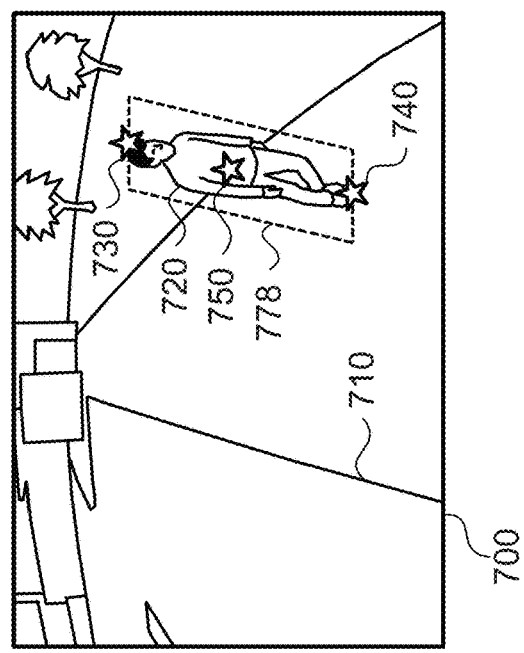

An image captured by an image capture device with a wide field of view often exhibits radial distortion, known as "pincushion" or "barrel" distortion. Image 700 in FIG. 7A illustrates an example of an image with radial distortion. Radial distortion causes straight lines in a scene to appear curved in a distorted image, such as an edge of a footpath 710. A radially distorted image can be corrected, also known as "undistorted", to remove the effects of radial distortion. Image 705 of FIG. 7B illustrates a corrected version of the distorted image 700, referred to as an undistorted image plane. Straight lines in a scene appear as straight lines in an undistorted image plane, such as an edge of a footpath 715. There exists a one to one correspondence between pixel locations in a distorted image and an undistorted image of the same scene. A pixel location on a distorted image is referred to as a "distorted location" and a corresponding pixel location on an undistorted image is referred to as an "undistorted location".

An object captured in an image by a camera with a relatively large tilt angle or roll angle will appear stretched, skewed and rotated by varying degrees depending on the object's location in the image. The distortions are independent of radial distortion, and are collectively referred to as "projective distortion". FIG. 7B illustrates an example of a projectively distorted image of an object 725 in an undistorted image 705. The object 725 relates to the object 720 in FIG. 7A. A "rectified" image is an image of an object in which the effects of both radial distortion and projective distortion have been minimized or removed. An image area 790 of FIG. 7C illustrates an example of a rectified image of an object, corresponding to the object 720 in the distorted image 700. The image area 790 relates to a portion of the distorted image 700 and the undistorted image plane 705.

The present description relates to a method for detecting an object in a distorted image, determining an appropriate bounding box in the distorted image. The arrangements described also relate to rendering a rectified image of the object using the determined bounding box. FIG. 1 illustrates an exemplary use case, a system 1000, to which the arrangements described may be applied. In the example of FIG. 1, a network 101 of multiple cameras, including cameras 100 and 105, is connected to a computer system 150 on which the arrangements described may be applied. An overall goal of the system 1000 is to track and analyse objects of interest across the camera network 101. An operator interacts with the computer system 150 through a graphical user interface (GUI). An example visual presentation 110 is displayed by the computer system 150 during execution of the GUI. The GUI includes a representation of a location of each camera in the network 101 as an icon 118 on a map 115, a video stream shown using a current video frame 120 from a selected network camera (e.g., from the camera 105), and a list 125 of objects of interest represented by rectified images 130 and 135. The video stream represented by the frame 120 includes a representation of bounding boxes, 140, 141 and 142 corresponding to objects 145, 146 and 147 detected in the frame 120. The computer system 150 matches objects of interest, such as the objects 130 and 135, to objects detected in the current frame, 140, 141 and 142, by rendering a rectified image of each object, extracting an appearance descriptor and determining a similarity between appearance descriptors.

This exemplary arrangements described apply to a range of applications. In one application, the GUI 110 allows a security guard to manually select an object of interest by clicking within a bounding box corresponding to a detected object in the video frame 120. Video data is streamed from the cameras 100 and 105 and analysed in real time or near real time. An operator of the computer system 150 is alerted if one of the detected objects matches an object of interest. In one example of the security application, an alert icon 138 is displayed next to the object of interest 135, if the computer system 150 determines that the object of interest 135 is similar to the detected object 147. In another example, the video is recorded analysed offline, and the computer system 150 returns a ranked list of images of one or more candidate objects that are determined to match the object of interest.

In another application, the computer system 150 automatically selects an object of interest and matches the object of interest across multiple cameras in order to analyse long-term behaviour of the object of interest. One example of the application selects objects entering a shopping centre and matches objects across multiple cameras to analyse shopping behaviour.

The arrangements described include the steps of detecting an object part in an image with radial and projective distortion, predicting the location of another object part in the distorted image, and determining a bounding box of the whole object in the distorted image. The arrangements described further relate to rendering a rectified image of the object compensated for radial and projective distortion. The described arrangements do not assume a planar ground in a captured image and do not require knowledge of the size of the object or the location of the image capture device relative to the scene. Furthermore, the described arrangements do not require a full object to be detected. Instead, the arrangements described include a step of detecting an object part. Detecting an object part is more reliable than detecting the whole object in the presence of radial and projective distortion. Finally, the described arrangements do not require the full image to be undistorted or rectified.

FIGS. 3A(1)-(2) and FIGS. 3B(1)-(3) illustrate an example of detecting an object part in a distorted image, predicting the location of another object part in the distorted image, and determining a bounding box of the whole object, according to one example arrangement. In FIG. 3A(1), the object is the person 320 and the object part is a head 322 of the person 320. An object part, such as the head 322, typically occupies a relatively small region of the image 300 and does not change significantly in appearance due to radial and projective distortion. Subsequently, object part detectors operate reliably on distorted images. Methods for detecting the head of a person are known in the art, and generates a part bounding box 325 centred on the head 322. The head location is represented by a point with a fixed relationship to the part bounding box. For the example of FIG. 3A(1), a head location 360 is the centre of the upper edge of the part bounding box 325. The size of the part bounding box 325 has a known fixed relationship to the size of the object 320. In one example, the height of the object is 3 times the height of the part bounding box. The fixed relationship between the size of the part bounding box 325 and the size of the object is typically determined based upon domain knowledge.

Given the location of the detected object part, a location of a second object part can be predicted in the distorted image. In the example distorted image 300 in FIG. 3A(1), the second object part is a foot 330 of the person 320. Assuming the person 320 is standing upright, the foot 330 location must lie on a vertical line in the scene of the image 300 intersecting the head location 360. For an image without radial distortion, it is known that vertical lines in a scene intersect a vertical vanishing point in the image. In the example of FIG. 3A(1), the predicted foot location would lie on a straight line 343, known as a "vertical vanishing line", joining the head location 360 with a vertical vanishing point 340. However, due to radial distortion, the true foot location does not lie on the straight vertical vanishing line 343, but on a curved line 345 in the distorted image 300. It is accordingly difficult to determine the bounding box needed for the person 320.

To predict the second part location in the presence of radial distortion, the location of the first part is transformed to an undistorted image plane. In the context of the present disclosure, an undistorted image plane relates to a transformation of a distorted image, such as the image 300, to correct radial distortion.

An undistorted image plane 305 in FIG. 3A(2) represents a transformation of the image 300 in which radial distortion is removed. In the undistorted image plane 305, vanishing lines are determined using straight lines. In one arrangement, denoting the distorted location of the first part as x and the undistorted location of the first part as x', the transformation from a distorted image to an undistorted image plane is given by an "Undistortion Equation" in accordance with Equation (1) as follows:

$$x'=c_0+(1+c_1 r+c_2 r^2+c_3 r^3+c_4 r^4)(x-c_0), \ r=\|x-c_0\|_2 \qquad (1)$$

In Equation (1) $c_0$ is the location of the "distortion centre" on the distorted image, $c_1$, $c_2$, $c_3$, and $c_4$ are the "distortion coefficients" and r is the radial distance of x from the distortion centre. The distortion centre and the distortion coefficients are typically determined by analysis of the distorted image itself using techniques known in the art, for example using Computer Vision System Toolbox™.

In the example, the distorted head location 360 in FIG. 3A(1) is transformed to an undistorted head location 365 (FIG. 3A(2)) according to Equation (1). On the undistorted image plane 305, the true foot location lies on a straight vertical vanishing line 355 joining the undistorted head location 365 with a vertical vanishing point 350. A predicted foot location 375 is determined as a point on the vertical vanishing line 355 below the head location at a distance of a fixed multiple of the height of the head bounding box 325. In one arrangement, the fixed multiple is set to a value of 4.0. The fixed multiple is typically determined based upon domain knowledge.

The predicted second part location on the undistorted image plane is transformed back to a distorted second part location on the distorted image. In one arrangement, the transformation to a distorted second part location on the distorted image is achieved by a "Distortion Equation" in accordance with Equation (2) as follows:

$$x=k_0+(x'-k_0)/(1+k_1 d+k_2 d^2+k_3 d^3+k_4 d^4), \ d=\|x'-k_0\|_2 \qquad (2)$$

where $k_0$ is the location of the "undistortion centre" on the undistorted image, $k_1$, $k_2$, $k_3$, and $k_4$ are the "undistortion coefficients" and d is the radial distance of x' from the undistortion centre. In the example in FIGS. 3A(1) and 3A(2), the undistorted foot location 375 is transformed to the distorted foot location 370 using Equation (2). The undistortion centre and undistortion coefficients are typically determined in a similar manner to the distortion centre and distortion coefficients of Equation (1).

A bounding box of the whole object, the person 320 in the distorted image can be predicted from the detected location of the first object part and the predicted location of the second object part. An example of a whole body bounding box is illustrated in FIGS. 3B(1) to 3B(2). An image 300b of FIG. 3B(1) corresponds to the distorted image 300 of FIG. 3A(1). A person 320b corresponds to the person 320 of FIG. 3A(1). A whole body bounding box 375b is predicted from a head location 360b (corresponding to the location 360 of FIG. 3A(1)) and a foot location 370b. The bounding box 375b is a parallelogram with a fixed aspect ratio and the head and foot locations 360b and 370b at the centre of the upper and lower boundaries respectively, according to one arrangement. An example of the fixed aspect ratio is 0.25. A rectified image of the object can be rendered based on the whole body bounding box using known methods such as the "remap" function in OpenCV.

Figure 2A:
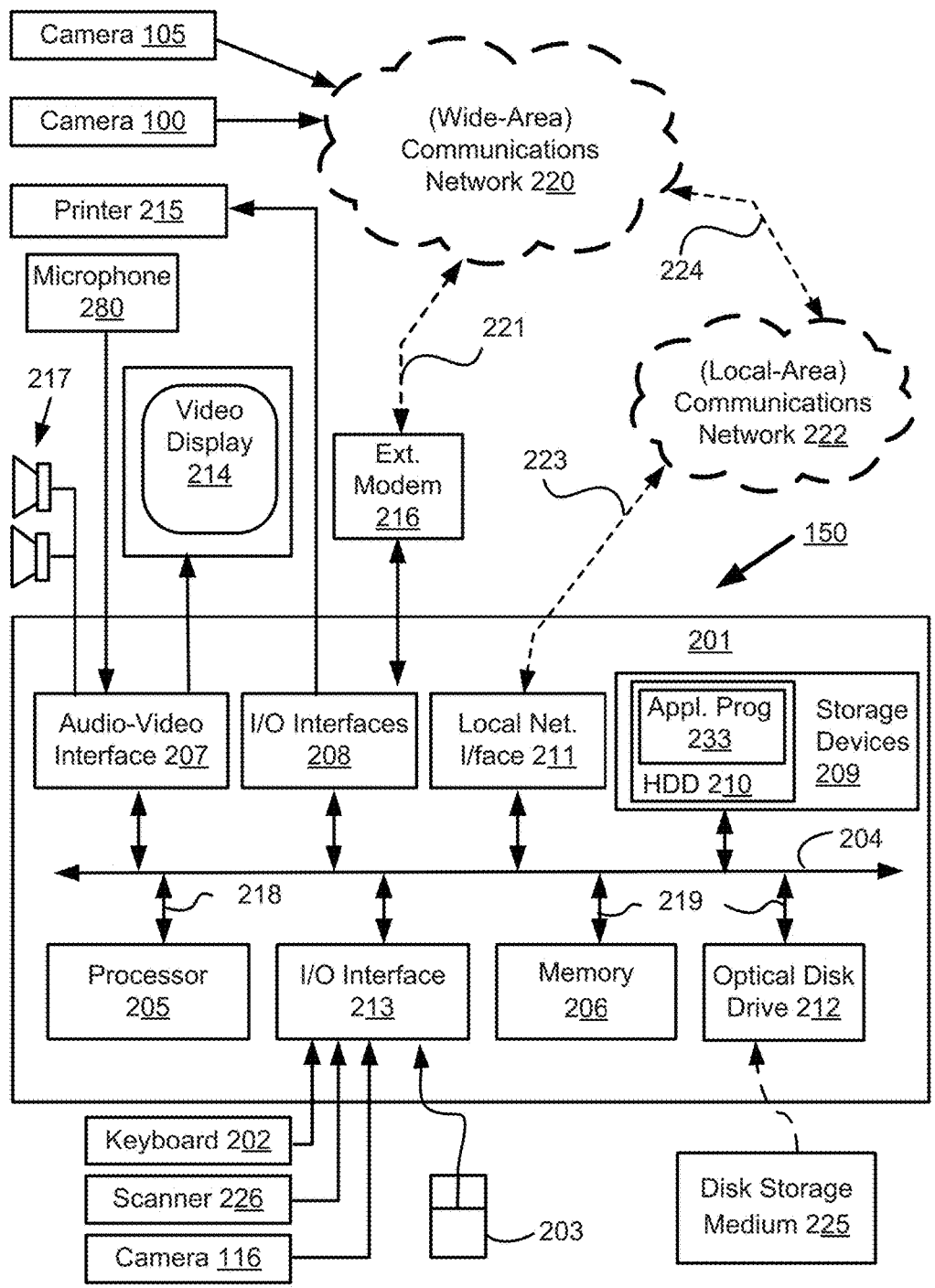
FIGS. 2A and 2B form a schematic block diagram of a general purpose computer system upon which the arrangements described can be practiced.
Figure 2B:
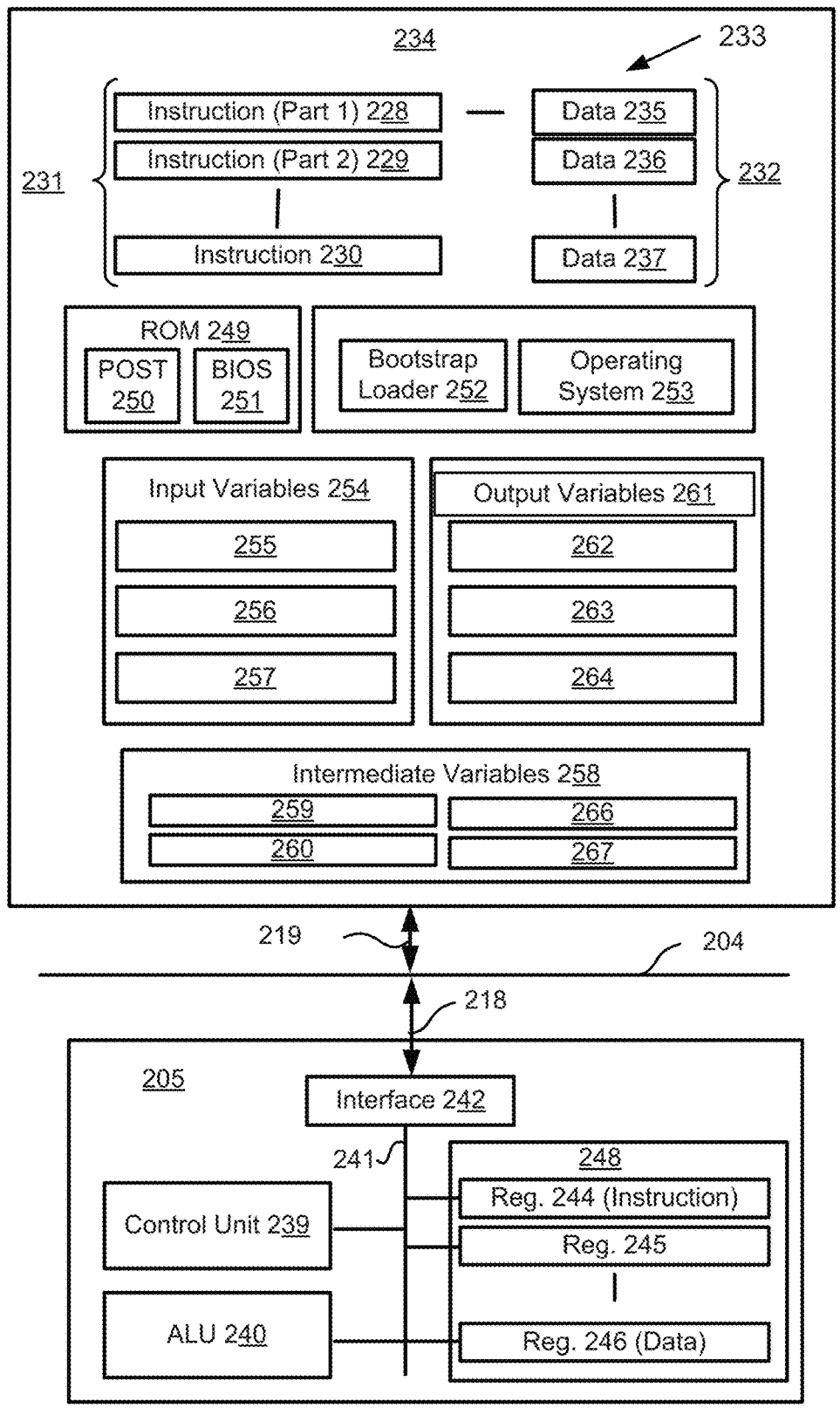

FIGS. 2A and 2B depict the general-purpose computer system 150, upon which the arrangements described can be practiced.

As seen in FIG. 2A, the computer system 150 includes: a computer module 201; input devices such as a keyboard 202, a mouse pointer device 203, a scanner 226, one or more cameras such as a cameras 116, and a microphone 280; and output devices including a printer 215, a display device 214 and loudspeakers 217. An external Modulator-Demodulator (Modem) transceiver device 216 may be used by the computer module 201 for communicating to and from remote cameras such as the cameras 100 and 105 over a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The remote cameras 100 and 105 form part of the camera network 101. In the arrangements described, the cameras 100 and 105 relate to video cameras. The camera network 101 can comprise any type of image capture devices capable of capturing image and/or video data from which vanishing points can be determined. The camera network 101 comprises a plurality of a single type of image capture device. In other arrangements, image capture devices integral or proximate to the computer module 201, such as the camera 116, can form part of the camera network 101.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 116 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 150 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 150.

The components 205 to 213 of the computer module 201 typically communicate via an interconnected bus 204 and in a manner that results in a conventional mode of operation of the computer system 150 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The methods described may be implemented using the computer system 150 wherein the processes of FIGS. 4, 5, 6, and 9, to be described, may be implemented as one or more software application programs 233 executable within the computer system 150. In particular, the steps of the methods described are effected by instructions 231 (in FIG. 2B) in the software 233 that are carried out within the computer system 150. The software instructions 231 may be formed as one or more code modules, each for performing one or more particular tasks. The software may also be divided into two separate parts, in which a first part and the corresponding code modules performs the methods described and a second part and the corresponding code modules manage a user interface between the first part and the user.

The software 233 may be stored in a computer readable medium, including the storage devices described below, for example. The software is loaded into the computer system 150 from the computer readable medium, and then executed by the computer system 150. A computer readable medium having such software or computer program recorded on the computer readable medium is a computer program product. The use of the computer program product in the computer system 150 preferably effects an advantageous apparatus for implementing the methods described.

The software 233 is typically stored in the HDD 210 or the memory 206. The software is loaded into the computer system 150 from a computer readable medium, and executed by the computer system 150. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 150 preferably effects an apparatus for practicing the arrangements described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 150 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 150 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 150 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes the sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The arrangements described use input variables 254, which are stored in the memory 234 in corresponding memory locations 255, 256, 257. The arrangements described produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 6 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 4:
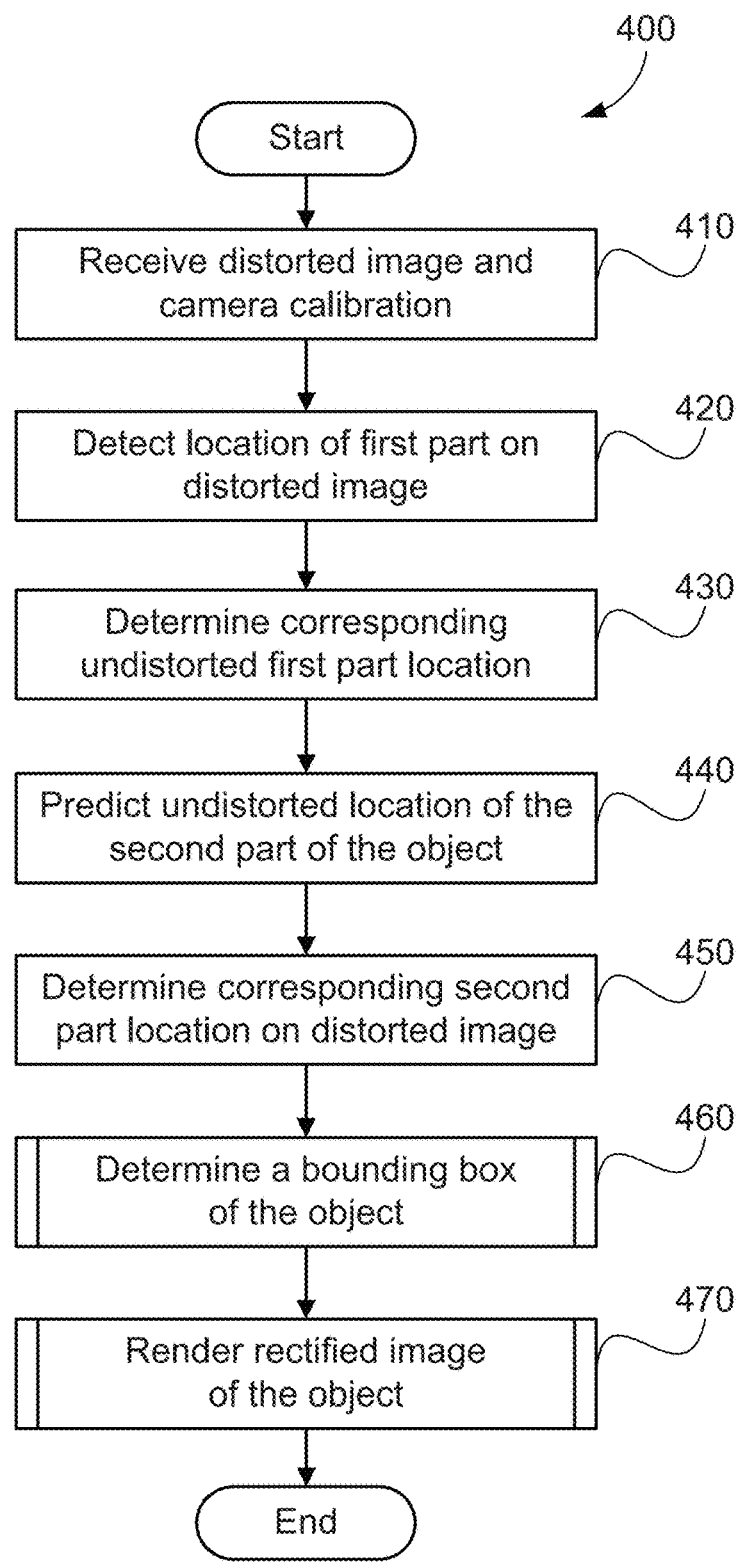
FIG. 4 is a schematic flow diagram of a method of determining an object in an image with radial and projective distortion and rendering a rectified image of the object.

FIG. 4 shows a method 400 for determining a bounding box of an object in an image with radial and projective distortion and rendering a rectified image of the object, according to one example arrangement. The method 400 may be implemented as one or more software code modules of the software application program 233 resident in the hard disk drive 210 and being controlled in execution by the processor 205. The following description provides details, examples and alternative implementations for the main steps of the method 400. Further details, examples and alternative implementations of steps 460 and 470 of the method 400 are described hereafter. The method 400 is described below by way of example with reference to FIGS. 3A(1)-(2) and 3B(1)-(3).

The method 400 starts at a receiving step 410. A distorted image and corresponding camera calibration parameters are received as input. The distorted image and calibration parameters may be received from the camera 105, for example. As described above, the calibration parameters include the distortion centre and coefficients in Equation (1), the undistortion centre and coefficients in Equation (2), and the tilt, angle, roll angle and focal length of the camera, from which also the vanishing point can be derived. The vanishing point is derived using known methods. Some of the calibration parameters, such as the distortion centre and the distortion coefficients for example, are determined from visual features of the received distorted image. Parameters relating to the tilt angle, roll angle and focal length of the camera can be determined from properties of received image data.

The method 400 then progresses under execution of the processor 205 from step 410 to a detecting step 420. In execution of the step 420 the first part of an object is detected in the distorted image received as input in step 410. In one arrangement, as illustrated in FIG. 3A(1), the object is the person 320, the first object part is the head 322 of the person 320. A head detector application executes at step 420 and determines the bounding box 325 centred on the location of the head 322. In another arrangement, the object part is detected by matching a shape template to edges extracted from the image 300. In one example, an omega shape template is matched to edges in the image to determine a head and shoulder region. In yet another arrangement, the objects are detected using a supervised machine learning method such as an object part detector. An object part detector classifies a candidate image region as containing a known type of object or not, based on a set of previously received training images of the object part. Candidate image regions are generated on a uniform grid in the image. The output of detection step 420 is a bounding box containing the first object part, such as the bounding box 325.

In some images, more than one object part is detected at step 420. In one embodiment of step 420, object part detection is followed by performing object tracking on the detected objects in order to associate observations of the same object part over multiple frames in a video sequence. In one arrangement, naïve tracking is performed by assuming Brownian motion and associating a detected object part in one frame to the detected object part at the nearest image location in a previous frame. In another arrangement, tracking is performed by estimating the motion of the object part using a recursive Bayesian filter such as a Kalman filter or particle filter.

The method 400 then passes under execution of the processor 205 from step 420 to a determining step 430. Step 430 relates to a first part undistorting step. The location of the first object part on the undistorted image plane corresponding to the object part detected in the distorted image is determined at step 430. The determination of the location of the first object part on the undistorted image plane is determined based on the calibration parameters received at step 410. In one arrangement, as illustrated in FIG. 3A(1), the centre of the upper edge of the head bounding box 325 is determined as the head location 360 in the distorted image 300. The corresponding head location 365 in the undistorted image 300 is determined by the "Undistortion Equation" in accordance with Equation (1), where x is the distorted head location 360, x' is the undistorted head location 365, and the calibration parameters where $c_0$, $c_1$, $c_2$, $c_3$, and $c_4$ are received at receiving step 410. The output of step 430 is the location of the first object part on the undistorted image plane.

The method 400 then proceeds under execution of the processor 205 from step 430 to a second part predicting step 440. Execution of the step 440 predicts the location of the second object part on the undistorted image plane 305 based on the location (365) of the first part on the undistorted image plane 305. The location of a second part of the object on the undistorted image plane is predicted using a point on a vertical vanishing line of the undistorted image plane. In one arrangement, as illustrated in FIG. 3A(1), the object is a person and the second part is a foot. Given that the height of the distorted head bounding box 325 is h, the predicted foot location 375 (FIG. 3A(2)) is predicted as a point on the vertical vanishing line 355 intersecting the head location 365 and the undistorted vertical vanishing point 350 at a distance of 4 h below the distorted head location 365. The undistorted vertical vanishing point 350 is determined from calibration parameters received at receiving step 410.

In another arrangement, the predicted foot location 375 is on the vertical vanishing line 355 at a fixed distance of H below the distorted head location 365. One example of a fixed distance H is 200 pixels. In yet another arrangement, a second object part detector, corresponding to a foot detector, is applied to a sliding window of bounding boxes along the vertical vanishing line 355 to determine the location of the foot based on machine learning. Practitioners in the art will recognize that other criteria for predicting the foot location 375 on the vertical vanishing line 355 relative to the distorted head location 365 may equally be practised. The output of step 440 is the predicted location of the second object part on the undistorted image plane.

The method 400 then passes under execution of the processor 205 from step 440 to a second part distorting step 450. At the step 450, the location of the second object part on the distorted image corresponding to the predicted second object part on the undistorted image plane is determined. The location of the second object part on the distorted image is determined based upon the calibration parameters received in step 410. In one arrangement, as illustrated in FIGS. 3A(1)-(2), the distorted foot location 370 corresponding to the predicted foot location 375 on the distorted image 300 is determined by the "Distortion Equation" in accordance with Equation (2), where x is the distorted foot location 370, x' is the undistorted foot location 375, and the calibration parameters where $k_0$, $k_1$, $k_2$, $k_3$, and $k_4$ are received at receiving step 410. The output of step 450 is the location of the second object part on the undistorted image plane.

The method 400 then proceeds under execution of the processor 205 from step 450 to a bounding box determining step 460. Execution of the step 460 determines a bounding box of the object in the distorted image 300 based on the location of the first part detected at step 420 and the location of the second part determined at step 450. In one arrangement, as illustrated in FIGS. 3B(1) and 3B(2), a whole body bounding box 375b is predicted as a parallelogram with a fixed aspect ratio and the head location 360b and foot location 370b at the centre of the upper and lower boundaries respectively. In another arrangement, the whole body bounding box is further refined based on a foreground mask of the object. Details, examples and alternative implementations of a method 500 for determining a refined bounding box, as applied at step 460 of the method 400, are described below with reference to FIGS. 5 and 3B(1)-(3). The output of the step 460 is a bounding box of an object in the distorted image 300b. The determined bounding box relates to a location of the whole object 320b. In determining the bounding box, step 460 effectively operates to determine the object in the distorted image.

The method 400 then passes under execution of the processor 205 from step 460 to a rectification step 470. At step 470, a rectified image is rendered for the object in the bounding box determined at step 460. In one arrangement, an angle between a medial axis of the determined whole object bounding box and the vertical axis of the distorted image is determined. Then, the sub-image within the determined bounding box is rendered after rotation by the determined angle so that the object appears in an upright orientation. In another arrangement, a projective rotation is determined such that the object appears as viewed with centroid of the bounding box at the principle point in a virtual pan-tilt-zoom camera with zero roll. Then, the sub-image within the bounding box is rendered after applying the determined projective rotation. Details, examples and alternative implementations of a method 600 for rendering a rectified image of an object, as applied to the rectification step 470 of method 400, are described hereafter with reference to FIGS. 6 and 7. The output of the rectification step 470 is rectified image of an object, in which the effects of radial and projective distortion are minimized.

The method 400 concludes after completing the rectification step 470.

Figure 5:
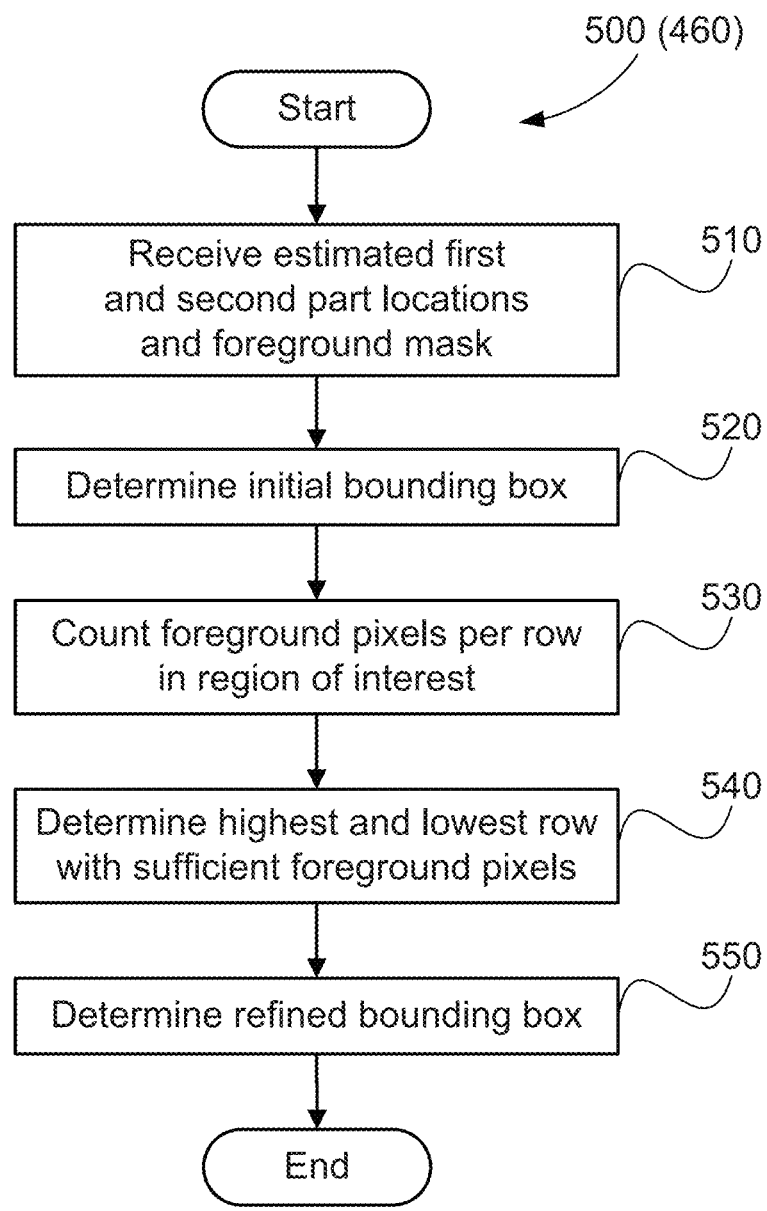
FIG. 5 is a schematic flow diagram of a method of determining a bounding box of an object as used in the method of FIG. 4.

A method 500 of determining a bounding box of an object in a distorted image, as executed in at least one embodiment of step 460 of the method 400, is now described with reference to FIG. 5. The method 500 is described by way of example with reference to FIGS. 3B(1)-(3). The method 500 may be implemented as one or more software code modules of the software application program 233 resident in the hard disk drive 210 and being controlled in execution by the processor 205.

The method 500 starts at a receiving step 510. At the step 510, a foreground mask, and a first object part location (determined at step 420 of the method 400), and a second object part location (determined at step 450 of method 400) are received as input. In one example, illustrated in FIG. 3B(1), the method 500 is applied to the object 320b in the image 300b. The step 510 executes to receive the head location 360b and the foot location 370b as input. In arrangements that receive a foreground mask at step 510, the foreground mask is determined using one of the arrangements described above.

The method 500 then proceeds under execution of the processor 205 from step 510 to an initial bounding box determining step 520. Execution of the step 520 determines an initial bounding box of the object based on the first and second object part locations received at step 510. In one arrangement, as illustrated in FIG. 3B(1), an initial bounding box 375b is determined as a parallelogram with a fixed aspect ratio. The head location 360b and the foot location 370b are at the centre of the upper and lower boundaries of the boundary box 375b respectively. An example of a fixed aspect ratio is 0.25. The output of step 520 is an initial bounding box of the object in the distorted image.

The method 500 then passes under execution of the processor 205 from step 520 to a pixel counting step 530. Execution of the step 530 counts the number of foreground pixels within the initial bounding box determined at step 460 for each row of the distorted image. An example of a foreground mask 308 for an object is illustrated in FIG. 3B(2). In foreground mask 308, pixels on the object 320b in the distorted image 300b correspond to pixels in a foreground region 380 of the foreground mask 308. A pixel count for each row of the bounding box 375b is illustrated by a plot 390, shown in FIG. 3B(3). In FIG. 3B(3), a horizontal axis 391h indicates increasing image rows relative to the bottom of the bounding box, and a vertical axis 391v indicates foreground pixel count. The output of step 530 is a pixel count per row of the bounding box.

The method 500 passes under control of the processor 205 from step 530 to a boundary determining step 540. Execution of the step 540 determines the highest and lowest rows of the initial bounding box 375b with sufficient foreground pixels, based on the pixel counts determined at step 530. In one arrangement, shown in FIG. 3B(3), the highest and lowest rows are determined respectively as a highest row t 394 and a lowest row b 392 with a pixel count exceeding a fixed threshold p 396. An example of a fixed threshold on the pixel count is 5. The fixed threshold is typically determined using experimentation or domain knowledge. The output of step 540 is the vertical image coordinate of the highest and lowest row with sufficient foreground pixels.

The method 500 then proceeds under execution of the processor 205 from step 540 to a refined bounding box determining step 550. The step 550 determines a refined bounding box of the object based on the highest and lowest image rows with sufficient foreground pixels determined at step 540. In one arrangement, as illustrated in FIG. 3B(1), the refined bounding box is a parallelogram with a fixed aspect ratio, a major axis collinear with a line joining the head location 360b and foot location 370b, left and right boundaries parallel to the major axis, and upper and lower boundaries on the highest and lowest image rows determined at step 540 respectively. An example of a fixed aspect ratio is 0.25. The output of step 550 is a refined bounding box of the object in the distorted image.

The method 500 concludes after completing the refined bounding box determining step 550.

The method 500 as described above determines the bounding box in the distorted image based on the determined locations of the first and second parts in the distorted image and a foreground mask. In other arrangements, a foreground mask is not received at step 510. The foreground mask can be determined using the arrangements described above if a reference image is received at step 510. Alternatively, the initial bounding box determined at step 520 is output form the method 500 and steps 530 to 550 are omitted.

Figure 6:
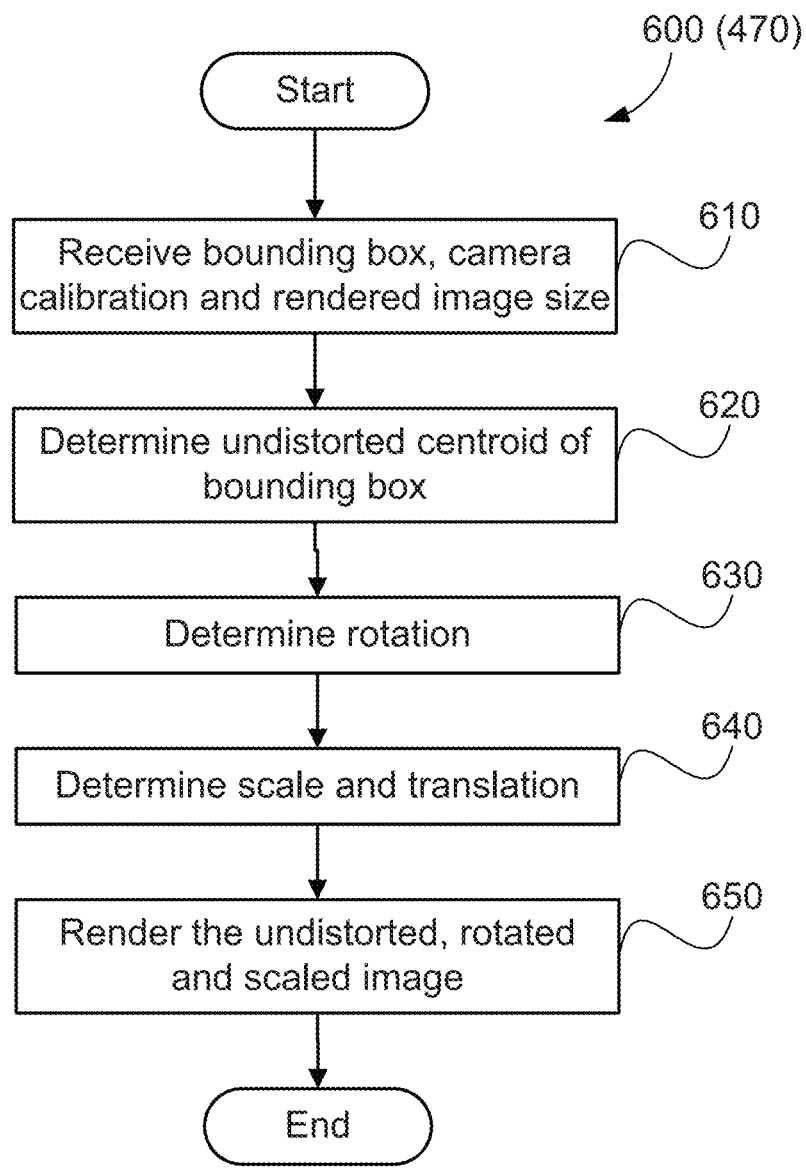
FIG. 6 is a schematic flow diagram of a method of rendering a rectified image of an object as used in the method of FIG. 4.

A method 600 of rendering a rectified image of an object, as executed in at least one embodiment of step 470 of the method 400, is now described with reference to FIG. 6. The method 600 is described by way of example with reference to FIGS. 7A-7C. The method 600 may be implemented as one or more software code modules of the software application program 233 resident in the hard disk drive 210 and being controlled in execution by the processor 205.

The image 700 of FIG. 7A relates to the image 300 of FIG. 3A(1). The undistorted image plane 705 of FIG. 7B relates to the undistorted image plane 305 of FIG. 3A(2). The method 600 starts at a retrieving step 610. At step 610, a set of camera calibration parameters, a rendered image and corresponding image size, and a bounding box (the refined bounding box determined at step 460 of the method 400) are received as input. In one example, illustrated in FIG. 7A, the method 600 is applied to the object 720 in the image 700, step 610 receives a bounding box 778, and dimensions w by h pixels for the rendered image size as input. An example of a rendered image size is 48 by 128 pixels.

The method 600 then proceeds under execution of the processor 205 from step 610 to a centroid determining step 620. The step 620 determines a centroid on the undistorted image plane 705 corresponding to the object in the bounding box on the distorted image received at step 610. In one arrangement, as illustrated in FIG. 7A, step 620 first determines a midpoint of an upper boundary 730 and a midpoint of a lower boundary 740 of the bounding box 778 in the distorted image 700.

Referring to FIG. 7B, an undistorted upper midpoint 735 and an undistorted lower midpoint 745 corresponding to the distorted upper midpoint 730 and distorted lower midpoint 740 (FIG. 7A) respectively are determined using the "Undistortion Equation" in accordance with Equation (1). An undistorted centroid 755 is determined as the mean location of the undistorted upper and undistorted lower midpoints. In another arrangement, a centroid on the distorted image (700) is determined as a mean location 750 of the distorted upper midpoint 730 and distorted lower midpoint 740. The undistorted centroid is then determined by projecting the distorted centroid 750 onto the undistorted image plane 705 using the "Undistortion Equation" in accordance with Equation (1) to minimise effects of radial distortion. The output of step 620 is the undistorted centroid of the bounding box.

The method 600 passes under execution of the processor 205 from step 620 to a rotation determining step 630. The step 630 determines a rotation of the object in the bounding box to minimise projective distortion. One arrangement, as illustrated in FIG. 7B, determines a transformation of the undistorted image plane such that a line 760 collinear with the undistorted upper midpoint 735 and undistorted lower midpoint 745 of the bounding box is parallel to the vertical axis of the undistorted image frame. The object centroid 755 is translated to a principle point of the image. In the example of FIG. 7B, the angle between the line 760 (the medial axis of the whole object bounding box 778) and a vertical axis of the undistorted image plane is a. The rotation is determined using a "Rotation Transformation Equation" in accordance with Equation (3) as follows:

$$\begin{pmatrix} x' \\ y' \end{pmatrix} = \begin{bmatrix} \cos a & -\sin a \\ \sin a & \cos a \end{bmatrix} \left[ \begin{pmatrix} p' \\ q' \end{pmatrix} - \frac{1}{2} \begin{pmatrix} w \\ h \end{pmatrix} \right] + \begin{pmatrix} a' \\ b' \end{pmatrix} \quad (3)$$

In Equation (3) (x', y') is a pixel coordinate on the undistorted image plane, (a', b') is the centroid 755 of the object on the undistorted image plane, (w, h) are the dimensions of the rectified image (FIG. 7C), and (p', q') is a pixel coordinate on the rotated image plane. The output of step 740 is the rotation transformation.

Practitioners in the art will recognize that alternatives methods for step 630 that determine a transformation to rectify an image may equally be practised. In one alternative implementation, a projective rotation is determined such that the object appears as viewed aligned with the centroid 755 at the principle point in a virtual pan-tilt-zoom camera with zero roll and image dimensions of w by h. In another alternative implementation, an affine transformation is determined at step 630 to correct for rotation and shearing caused by projective distortion. The determined rotation transformation is applied at the step 630 to minimise effects of projective distortion. Applying the determined rotation to the bounding box effectively rotates a sub-image in the bounding box to an upright orientation.

The method 600 then proceeds under execution of the processor from step 630 to a scale determining step 640. The step 640 determines a transformation required to render a rectified image of an object within an image with dimensions of w by h pixels. One arrangement, as illustrated in FIG. 7B, determines a scale based on a distance h' between the undistorted upper midpoint 735 and the undistorted lower midpoint 745 of the bounding box received at step 610. The scale and translation are determined according to a "Scale Transformation Equation" in Equation (4) as follows:

$$\begin{pmatrix} p' \\ q' \end{pmatrix} = \frac{h'}{h} \begin{pmatrix} p \\ q \end{pmatrix} \quad (4)$$

where (p, q) is a pixel location on the rectified image, and (p', q') is an unscaled pixel location after applying the transformation determined at step 640. The output of step 640 is the scale transformation.

The method 600 then passes under execution of the processor 205 from step 640 to a rendering step 650. The step 650 renders an undistorted, rotated and scaled image of the object to minimise radial and projective distortion. In one arrangement, as illustrated in FIG. 7C, a rectified image 790 is determined by resampling the distorted image 700 as follows. For a pixel in the rectified image 790 located at image coordinates (p, q), the corresponding pixel location (p', q') on the rotated image plane is determined according to the "Scale Transformation Equation" of Equation (4). The corresponding pixel location (x', y') on the undistorted image plane is determined according to the "Rotation Transformation Equation" of Equation (3). The corresponding pixel location (x, y) on the distorted image plane is determined according to the "Distortion Equation" of Equation (2). The colour value at the pixel location (p, q) in the rectified image is determined by interpolating the colour values in the neighbourhood of the location (x, y) in the distorted image (700, FIG. 7A). The colour values at all pixel locations in the rectified image 790 are determined similarly. The output of step 650 is a rectified image of an object of dimension w by h.

The method 600 concludes after completing the rendering step 650.

Figure 8B:
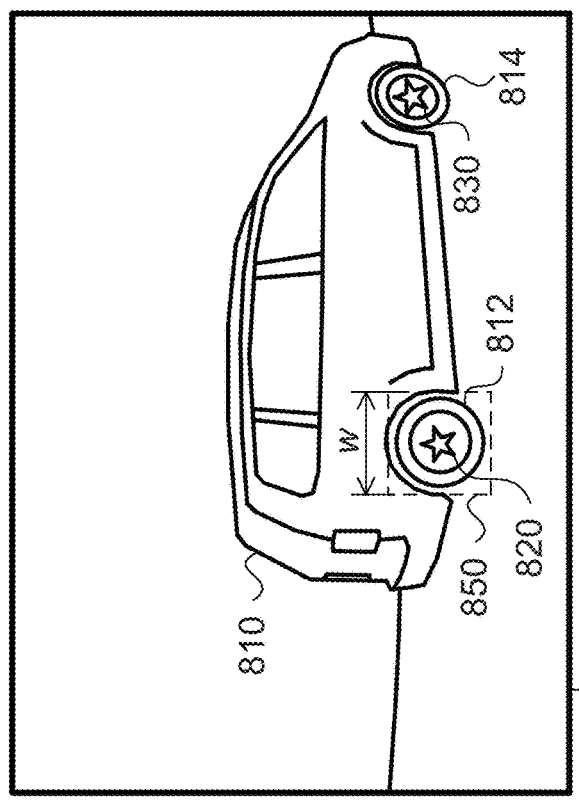
FIGS. 8A and 8B show an example of detecting a first part location and second part location of an object on a distorted image.
Figure 8A:
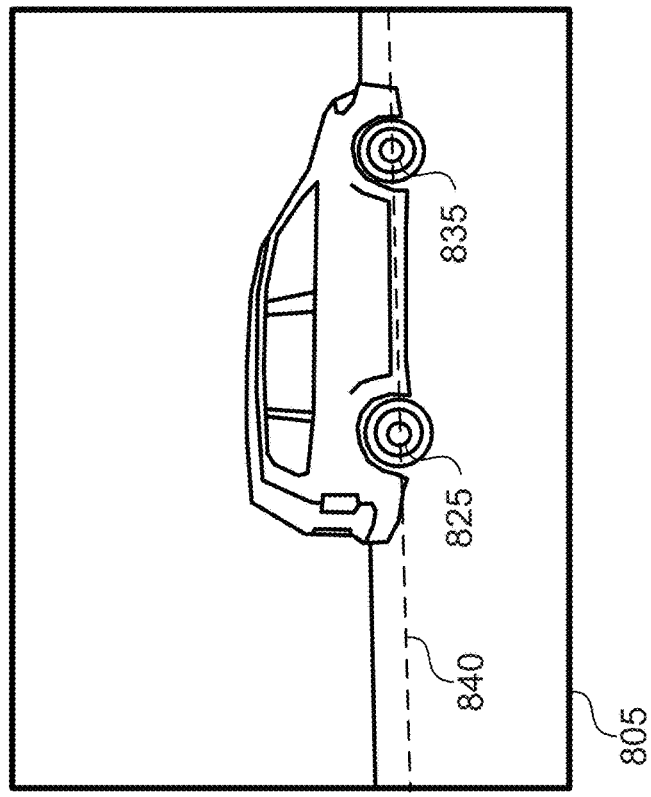

The method 400 was described by way of example with reference to FIGS. 3A(1)-(2) and 3B(1)-(3) in which the object was a person, the first object part was a head and the second object part was a foot. Practitioners in the art will recognize that the method 400 may equally be applied to other kinds of objects and object parts. An alternative implementation of the method 400 is described with reference to FIGS. 8A and 8B. In the example of FIGS. 8A and 8B, the object is a vehicle 810 detected in a distorted image 800. The first object part is a rear wheel 812 of the vehicle 810, and the second object part is a front wheel 814 of the vehicle.

In the detecting step 420 of the method 400, using the example of FIGS. 8A and 8B, a wheel detector detects or determines a bounding box 850 centred on a location 820 of the rear wheel 812. In one implementation of detecting step 420, an ellipse template is matched to edges in the image 800 to determine the location of a wheel. In another implementation of detecting step 420, objects are detected using a supervised machine learning method such as an object part detector.

In the first part undistorting step 430, in one arrangement, a centre 825 of the wheel 812 in an undistorted image 802, corresponding to the centre 820 of the wheel 812 in the distorted image plane 805, is determined using the "Undistortion Equation" in accordance with Equation (1). In the second part predicting step 440 of method 400, in one arrangement, a location 835 of the front wheel is predicted as an image location along a horizontal vanishing line 840 intersecting the rear wheel location 825, at a distance corresponding to a fixed multiple of the rear wheel bounding box width w. An example of a fixed multiple is 4.0. In the second part distorting step, a predicted front wheel location 830 on the distorted image 800 corresponding to the predicted front wheel location 835 on the undistorted image 805 is determined using the "Distortion Equation" in accordance with Equation (2).

In step 460 of the method 400, a whole object bounding box is determined from the detected rear wheel location 820 and the predicted front wheel location 830. In one arrangement, the whole object bounding box is determined based on a fixed known relative location of the wheels 812 and 814 to the body of the vehicle 810. Finally, in step 470 of the method 400, a rectified image is rendered to remove the effects of radial and projective distortion. The step 470 is implemented for objects such as vehicles in a similar manner to objects such as people.

As illustrated in FIG. 1, the arrangements described can be applied to the problem of analysing the appearance or behaviour of an object in a surveillance camera network, by rectifying the image of an object to a canonical orientation. One example of a canonical orientation is an upright orientation, wherein the vertical axis of the object is parallel to the vertical axis of the image coordinate frame. For example, as illustrated in FIG. 1, a person 147 detected in the video frame 120 is displayed to the user as a rectified image 135. Another example of a canonical orientation is a horizontal orientation, wherein the horizontal axis of the object is parallel to the horizontal axis of the image coordinate frame. Rectifying an object for display to the user can facilitate rapid interpretation of the image by removing variation due to distortions.

Rectifying an object before extracting an appearance descriptor can also improve automatic image analysis by increasing the repeatability of extracted image features.

Figure 9:
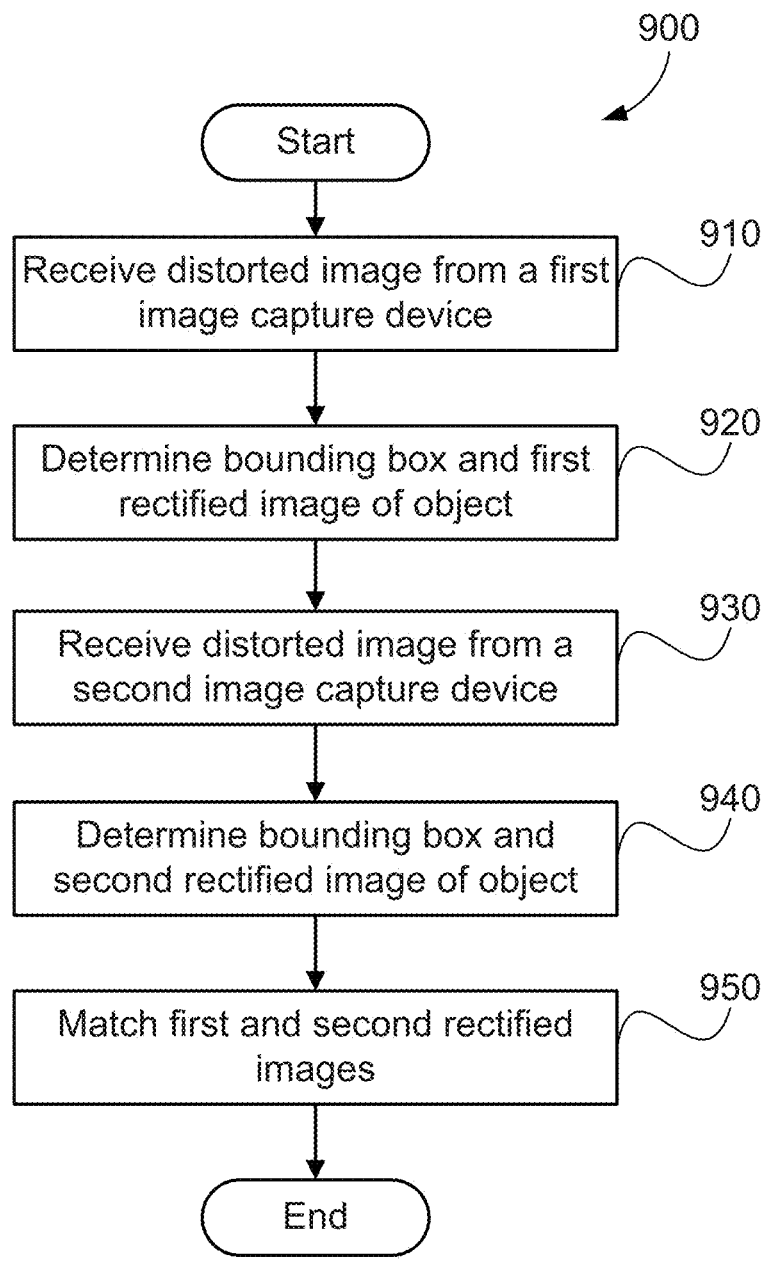
FIG. 9 is a schematic flow diagram of an example method of matching objects using the method of FIG. 4.

FIG. 9 shows a method 900 of matching objects from images captured using one or more image capture devices of the network 101. The method 900 may be implemented as one or more software code modules of the software application program 233 resident in the hard disk drive 210 and being controlled in execution by the processor 205.

The method 900 starts at a receiving step 910. An image captured using a first image capture device of the network 101, for example the camera 100, is received at step 910. The image received at step 910 can be a distorted image.

The method 900 continues under execution of the processor 205 to a determining step 920. A first rectified image of an object in the image received at step 900 is determined using the method 400 of FIG. 4 at step 920.

The method 900 continues to a receiving step 930. An image captured using an image capture device of the network 101, for example the camera 105, is received at step 930. The image received at step 930 can be a distorted image. The method 900 continues under execution of the processor 205 to a determining step 940. A second rectified image of an object in the image received at step 930 is determined using the method 400 of FIG. 4 at step 940.

In the steps 910 to 940, the images of two objects observed in two camera views are rectified according to the method 400. The steps 910 and 920 may execute in parallel to the steps 930 and 940 in some arrangements.

Once the first and second rectified images of objects are determined, the method 900 continues under execution of the processor 205 to a match step 950. Appearance descriptors are the extracted from the pair of rectified images at step 950 and a similarity or dissimilarity score is generated to determine whether the objects have the same identity. One example of an appearance descriptor is a histogram of pixel colours and image gradients within predefined spatial cells of the rectified image. Another example of an appearance descriptor is a bag-of-words model of quantized keypoint descriptors. One example of a dissimilarity score is a Mahalanobis distance between the appearance descriptors of the two objects. The person skilled in the art will recognise that other similarity or dissimilarity scores may be determined to compare two appearance descriptors. Step 950 effectively matches the image of an object (received at step 910) to at least one other image of an object (received at step 930) based on the determined appearance descriptors.

One example of determining whether the two objects match (have the same identity) is to compare the similarity score to a fixed threshold. If the score exceeds the threshold, the objects are determined to have the same identity. Another example of determining whether the first object has the same identity as the second object is to compare the similarity score to the similarity score between the first object and all other objects in the video stream. If the similarity score for the second object is less than all other objects, the first and second object are determined to have the same identity. The computer system 150 generates a response if the two objects are determined to have the same identity. In one example, illustrated in FIG. 1, the match is indicated by the appearance of an icon 138 in a GUI image 110. In another example, the response is to tag the second object for further automatic analysis, such as classifying whether the behaviour of the object as suspicious or not.

The arrangements described do not require assumption of a planar scene in a captured image. In determining a portion of an image to an undistorted image plane, finding locations of first and second parts of an object in the undistorted image plane to select a distorted image bounding box, the arrangements described do not require information relating to camera location or object height. Further, in selecting relatively small parts of the object, e.g., the head of a person, the effect of distortion can be minimised in detecting the object. In translating or refining the bounding box, the arrangements described can provide a more recognisable image to a view or user. The method of FIG. 6 rectifies a portion of the image relating to the determined bounding box only rather than a whole distortion image, thereby decreasing computational processing.

The arrangements described can improve accuracy of object matching in images by comparison of image portions in similar orientations. Additionally, costs of rendering multiple overlapping images are avoided.

The arrangements described are applicable to the computer and data processing industries and particularly for image processing industries such as surveillance and security industries.

The foregoing describes only some embodiments of the present invention, and modifications and/or changes can be made thereto without departing from the scope and spirit of the invention, the embodiments being illustrative and not restrictive.

The invention claimed is:

1. A method for determining an object in a distorted image, comprising: detecting a location of a first part of the object on the distorted image on a distorted image plane; determining a corresponding location of the first part of the object on an undistorted image plane corresponding to the distorted image based on a plurality of calibration parameters; predicting a location of a second part of the object on the undistorted image plane based on the determined location of the first part of the object on the undistorted image plane; determining a corresponding location of the second part of the object on the distorted image based on the predicted location of the second part of the object on the undistorted image plane and the calibration parameters; determining the object based on the detected location of the first part of the object and the determined location of the second part of the object in the distorted image; generating a rectified image of the object based on a determined bounding box; determining an appearance descriptor based on the rectified image; and matching the image of the object to at least one other image of the object based on the determined appearance descriptors.

2. The method of claim 1, wherein the object is a person, the first part of the object is the head of the person and the second part of the object is a foot of the person.

3. The method of claim 1, wherein the object is a vehicle, the first part of the object is a rear wheel of the vehicle and the second part of the object is a front wheel of the vehicle.

4. The method of claim 1, wherein the object is determined by determining the bounding box of the object in the distorted image.

5. The method of claim 4, wherein the bounding box in the distorted image is determined based on determined locations of the first and second parts and a foreground mask.

6. The method of the claim 4, further comprising:
rotating a sub-image in the bounding box to an upright orientation.

7. The method of claim 4, further comprising:
applying a projective rotation of a sub-image in the bounding box to align a centroid of the bounding box to the principal point of a virtual camera with zero roll.

8. The method of claim 1, further comprising:
determining an initial bounding box based on the determined locations of the first object part and second object part on the distorted image;
counting a number of foreground pixels for each image row in the bounding box; and
determining a refined bounding box based on highest and lowest image rows in the initial bounding box with a number of foreground pixels exceeding a threshold.

9. The method of claim 1, further comprising:
generating a rectified image of the object and displaying the rectified image to an operator via a graphical user interface.

10. The method according to claim 1, wherein the calibration parameters comprise at least one of tilt angle, roll angle and focal length of an image capture device used to capture the distorted image, the calibration parameters used to derive a vanishing point of the object.

11. The method according to claim 1, wherein the calibration parameters comprise at least a distortion centre and distortion coefficients of the distorted image.

12. The method according to claim 1, wherein the calibration parameters comprise at least a distortion centre and distortion coefficients of the distorted image, the distortion centre and the distortion coefficients determined from the distorted image.

13. The method according to claim 1, wherein the location of a second part of the object on the undistorted image plane is predicted using a point on a vertical vanishing line of the undistorted image plane.

14. A non-transitory computer readable medium having a program stored thereon for determining an object in a distorted image, the program comprising: code for detecting a location of a first part of the object on the distorted image on a distorted image plane; code for determining a corresponding location of the first part of the object on an undistorted image plane corresponding to the distorted image based on a plurality of calibration parameters; code for predicting a location of a second part of the object on the undistorted image plane based on the determined location of the first part of the object on the undistorted image plane; code for determining a corresponding location of the second part of the object on the distorted image based on the predicted location of the second part of the object on the undistorted image plane and the calibration parameters; code for determining the object based on the detected location of the first part of the object and the determined location of the second part of the object in the distorted image; code for generating a rectified image of the object based on a determined bounding box; determining an appearance descriptor based on the rectified image; and matching the image of the object to at least one other image of the object based on the determined appearance descriptors.

15. An apparatus for determining an object in a distorted image, the apparatus configured to detect a location of a first part of the object on the distorted image on a distorted image plane; determine a corresponding location of the first part of the object on an undistorted image plane corresponding to the distorted image based on a plurality of calibration parameters; predict a location of a second part of the object on the undistorted image plane based on the determined location of the first part of the object on the undistorted image plane; determine a corresponding location of the second part of the object on the distorted image based on the predicted location of the second part of the object on the undistorted image plane and the calibration parameters; determine the object based on the detected location of the first part of the object and the determined location of the second part of the object in the distorted image; generate a rectified image of the object based on a determined bounding box; determine an appearance descriptor based on the rectified image; and match the image of the object to at least one other image of the object based on the determined appearance descriptors.

16. A system comprising: an image capture device configured to capture a distorted image; a memory for storing data and a computer readable medium; and a processor coupled to the memory for executing a computer program, the processor in communication with the image capture device via a network, the program having instructions for: detecting a location of a first part of an object on a distorted image on a distorted image plane received from the image capture device; determine a corresponding location of the first part of the object on an undistorted image plane corresponding to the distorted image based on a plurality of calibration parameters; predict a location of a second part of the object on the undistorted image plane based on the determined location of the first part of the object on the undistorted image plane; determine a corresponding location of the second part of the object on the distorted image based on the predicted location of the second part of the object on the undistorted image plane and the calibration parameters; determine the object based on the detected location of the first part of the object and the determined location of the second part of the object in the distorted image; generate a rectified image of the object based on a determined bounding box; determine an appearance descriptor based on the rectified image; and match the image of the object to at least one other image of the object based on the determined appearance descriptors.

17. The non-transitory computer readable medium of claim 14, wherein the object is a person or a vehicle, the first part of the object is the head of the person or a rear wheel of the vehicle and the second part of the object is a foot of the person or a front wheel of the vehicle, respectively.

18. The apparatus of claim 15, wherein the object is a person or a vehicle, the first part of the object is the head of the person or a rear wheel of the vehicle and the second part of the object is a foot of the person or a front wheel of the vehicle, respectively.

19. The system of claim 16, wherein the object is a person or a vehicle, the first part of the object is the head of the person or a rear wheel of the vehicle and the second part of the object is a foot of the person or a front wheel of the vehicle, respectively.

* * * * *